Feb. 27, 1934.  C. H. LASKER  1,948,820
WATER SEALED RECEPTACLE
Filed June 3, 1931
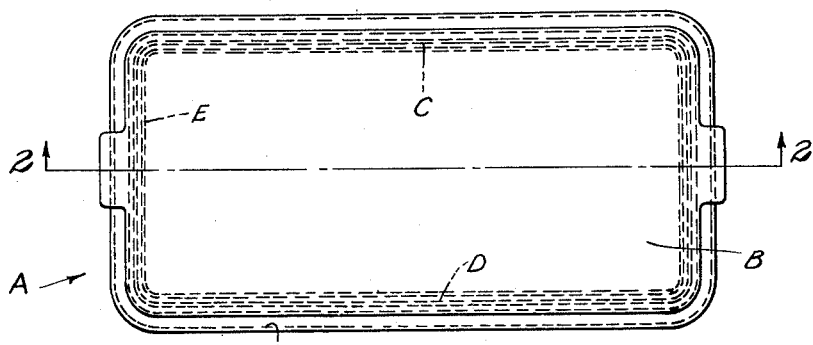
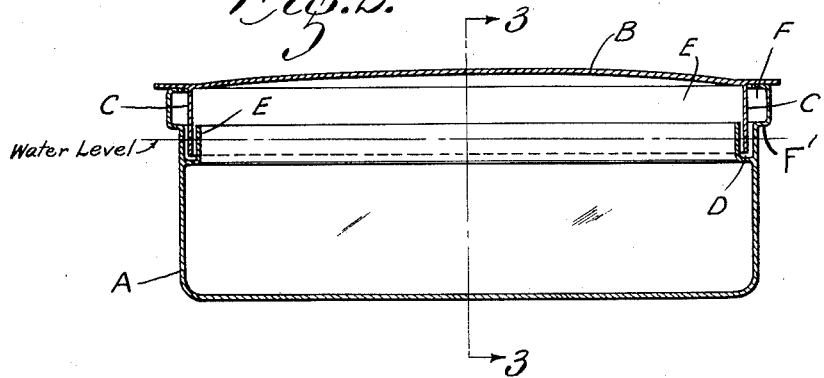
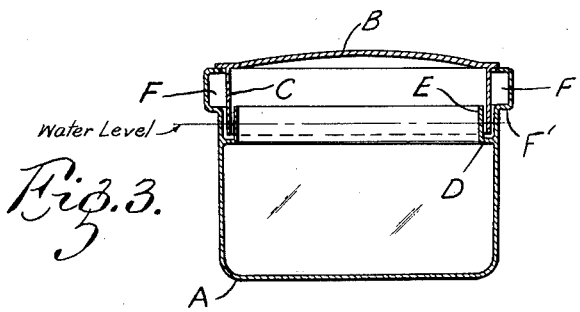
INVENTOR:
CHARLES HENRY LASKER.
By James L. Hopkins
ATTORNEY.

Patented Feb. 27, 1934

1,948,820

UNITED STATES PATENT OFFICE 1,948,820

WATER-SEALED RECEPTACLE

Charles Henry Lasker, Joliet, Ill.

Application June 3, 1931. Serial No. 541,961

1 Claim. (Cl. 220—45)

My invention relates to a water-sealed receptacle for use with electric refrigerators and the like. It has for its object to isolate such material which emits an odor offensive to other food products contained in the refrigerator, and also to restore and hold the vitality and crispness of any or all of the green vegetables. In constructing my device, I have produced an all-metal container wherein a water-seal dispenses with clamps or gaskets of rubber or like resilient material, resulting in a container of durability and efficiency, made of non-absorbent material.

In the drawing—

Fig. 1 is a top plan view of a device embodying my invention.

Fig. 2 is a longitudinal vertical view of the same in mid-section taken on the line 2—2 of Fig. 1.

Fig. 3 is a transverse, vertical sectional view of the same taken on the line 3—3 of Fig. 2.

Description

Referring to the drawing, A represents a metallic container (preferably formed in one piece) in the walls of which a marginal channel F is formed contiguous to the open top of the container. An L-shaped flange E projects inwardly from the container walls so as to form a trough D adjacent to the channel F and immediately below said channel. The formation of the channel F provides an outwardly extending shoulder F' which may serve as the supporting surface for the container within a refrigerator. A cover B is provided with a downwardly depending marginal flange C spaced a short distance inwardly from the peripheral edge of the cover so that the cover may rest upon the container top with the flange extending into the container and into the trough D. It will be observed (Fig. 2) that when the cover B is in place and the flange C is in the trough D said trough and channel F are in communication so as to form in effect a single compartment. The advantage of this is that when the trough D is provided with water to the level of the line marked "water level" the container may be tilted through an angle of almost 90 degrees without the water entering the container as it will flow from the trough D into the channel F, which must be completely filled before the water will spill into the container.

I claim—

A receptacle comprising a container having a marginal channel formed in its walls contiguous to the open top of the container, said channel opening toward the inside of the container and an L-shaped flange projecting inwardly from the container walls to form a trough immediately below said channel and adapted for communication therewith, and a cover for the container having a depending flange arranged to extend through the open top of the container and into said trough.

CHARLES HENRY LASKER.